(12) United States Patent
Bolmal (10) Patent No.: US 11,736,747 B2
(45) Date of Patent: Aug. 22, 2023

(54) STORAGE AND DELIVERY DISTINCT MEDIA SEGMENTATION

(71) Applicant: RAKUTEN MOBILE, INC., Tokyo (JP)

(72) Inventor: Sachin Bolmal, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/456,630

(22) Filed: Nov. 26, 2021

(65) Prior Publication Data

US 2022/0408133 A1 Dec. 22, 2022

Related U.S. Application Data

(60) Provisional application No. 63/211,505, filed on Jun. 16, 2021.

(51) Int. Cl.
*H04N 21/231* (2011.01)
*H04N 21/2343* (2011.01)
*H04N 21/239* (2011.01)
*H04N 21/845* (2011.01)

(52) U.S. Cl.
CPC ... *H04N 21/234309* (2013.01); *H04N 21/231* (2013.01); *H04N 21/2393* (2013.01); *H04N 21/8456* (2013.01)

(58) Field of Classification Search
CPC ......... H04N 21/234309; H04N 21/231; H04N 21/2393; H04N 21/8456
See application file for complete search history.

(56) References Cited

U.S. PATENT DOCUMENTS

| 9,104,582 | B1 * | 8/2015 | Mukundan | H04N 21/234309 |
| 2010/0287475 | A1 * | 11/2010 | van Zwol | G06F 3/04817 715/723 |
| 2016/0134673 | A1 | 5/2016 | Macinnis | |
| 2016/0234519 | A1 * | 8/2016 | Terada | H04N 19/46 |
| 2017/0237794 | A1 | 8/2017 | Jarvi et al. | |
| 2020/0344510 | A1 * | 10/2020 | McMurray | H04N 21/234309 |

* cited by examiner

*Primary Examiner* — Hsiungfei Peng
(74) *Attorney, Agent, or Firm* — Hauptman Ham, LLP (57) ABSTRACT

Storage and delivery distinct media segmentation is performed by receiving a request from a network device for a media asset, retrieving a plurality of first packets from an object storage, each first packet of the plurality of first packets including a segment of the media asset of a first length, preparing, as the plurality of first packets are retrieved from the object storage, a plurality of second packets, each second packet of the plurality of second packets including a segment of the media asset of a second length, the second length being shorter than the first length, and transmitting, as the plurality of second packets are prepared, the plurality of second packets to the network device.

13 Claims, 6 Drawing Sheets

STORAGE AND DELIVERY DISTINCT MEDIA SEGMENTATION

PRIORITY CLAIM AND CROSS-REFERENCE

This application claims priority to Provisional Application No. 63/211,505, filed Jun. 16, 2021, which is hereby incorporated by reference in its entirety.

BACKGROUND

In some content delivery networks, media assets, such as songs, movies, or any other audio or video recording, are streamed from a server to devices through a network, such as the Internet. The server stores media assets in segments. Upon request from a device, the segments are transcoded, if necessary, and repackaged, if necessary, with the length of the segments remaining unchanged.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

If the segment length of a media asset is adjusted for delivery to devices, then the segment length is selected to be more responsive to changing network conditions. Adjusting the length for delivery does not always achieve the lowest latency while reading the media segments from storage. For example, when the media asset is stored in object storage, a larger segment size may have the lowest latency while reading the media segments.

At least some embodiments described herein improve latency while reading media segments by using storage and delivery distinct media segmentation. In at least some embodiments, whenever a request is received for a media asset, media segments are read from object storage and then re-segmented into media segments having a length for delivery that is shorter than the length of the media segments in object storage. In at least some embodiments, re-segmentation is performed during transcoding or packaging of the media segments for delivery.

In at least some embodiments, homogenous video transcoding changes quality attributes of a media asset, such as bit-rate, spatial or temporal resolution, and segment length. In at least some embodiments, packaging involves encapsulating media segments in different formats, such as HLS, DASH, etc. for delivery to devices, depending on the service, application, etc.

Figure 1:
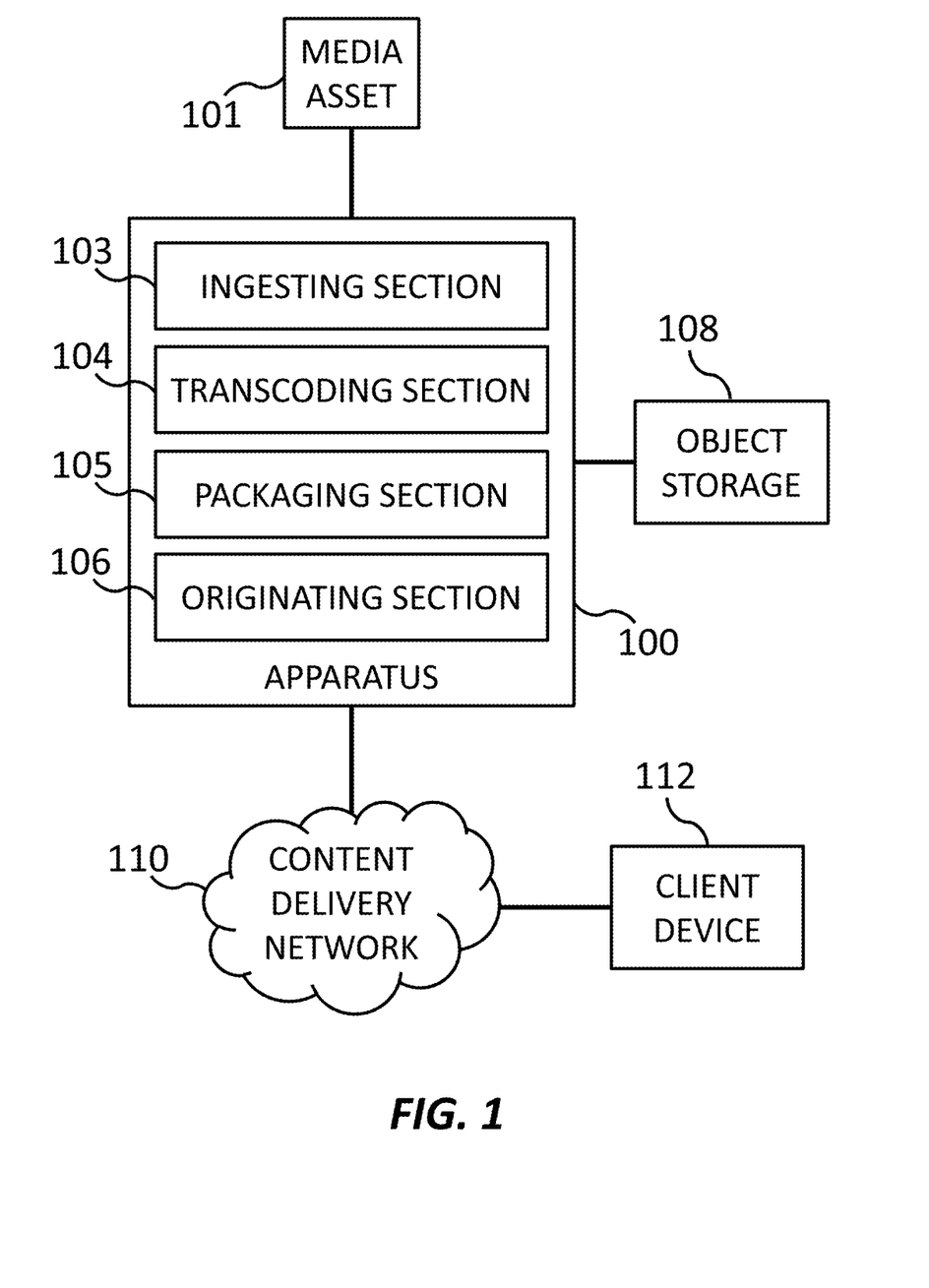
FIG. 1 is a schematic diagram of a system for storage and delivery distinct media segmentation, according to at least one embodiment of the present invention.

FIG. 1 is a schematic diagram of a system for storage and delivery distinct media segmentation, according to at least one embodiment of the present invention. The system includes an apparatus 100, a media asset 101, an object storage 108, a content delivery network 110, and a client device 112.

Apparatus 100 is configured for storage and delivery distinct media segmentation. Apparatus 100 is in communication with object storage 108 and content delivery network 110. Apparatus 100 includes an ingesting section 103, a transcoding section 104, a packaging section 105, and an originating section 106. In at least some embodiments, apparatus 100 is a host server that executes an on-premise operating system that hosts virtualizations provisioned by client computers, such as a cloud native environment. Such virtualizations are in the form of virtual machines, containers, or any other layer of execution between the bare-metal operating system or hypervisor and applications of client computers. In at least some embodiments, the virtualizations are containers, which share a common host kernel but have individual resource allocations. In at least some embodiments, ingesting section 103, transcoding section 104, packaging section 105, and originating section 106 are virtualizations that run applications for performing respective functions as explained hereinafter.

Media asset 101 is a digital representation of pre-recorded content. In at least some embodiments, media asset 101 is a digital representation of a song, a movie, or any other audio or video recording. In at least some embodiments, media asset 101 is in a compressed format. In at least some embodiments, media asset 101 is in an uncompressed, full quality format. In at least some embodiments, media asset 101 is received by apparatus 100 from a server across a network, a computer-readable medium read by apparatus 100, etc.

Object storage 108 is a computer-readable medium in communication with apparatus 100. In at least some embodiments, object storage 108 is in communication with apparatus 100 or has a direct connection to apparatus 100. In at least some embodiments, object storage is a component of apparatus 100. In at least some embodiments, apparatus 100 stores media asset 101 in object storage 108. In at least some embodiments, ingesting section 103, transcoding section 104, packaging section 105, and originating section 106 are stored on object storage 108 along with media asset 101. In at least some embodiments, media asset 101 is stored in a plurality of virtualizations in object storage 108, each virtualization including a segment of media asset 101.

Content delivery network 110 is a network of servers for delivering media assets, such as media asset 101, to client devices, such as client device 112. In at least some embodiments, content delivery network 110 includes edge servers distributed throughout a geographic area. In at least some embodiments, each edge server in content delivery network 110 is configured to retrieve media assets from apparatus 100 and deliver the requested media assets to client devices that are closer, from the perspective of the network, to the edge server than other edge servers in content delivery network 110. In at least some embodiments, content delivery network 110 further includes intermediary servers.

Client device 112 is device operated by a user or group of users that requests media assets from apparatus 100. In some embodiments, client device 112 includes a device having limited computational resources, such as smart watches, fitness trackers, Internet-of-Things (IoT) devices, etc., or a device having computational resources for a broader range of capabilities, such as smart phones, tablets, personal computers, etc. Client device 112 could also include a server or mainframe similar to apparatus 100.

Figure 2:
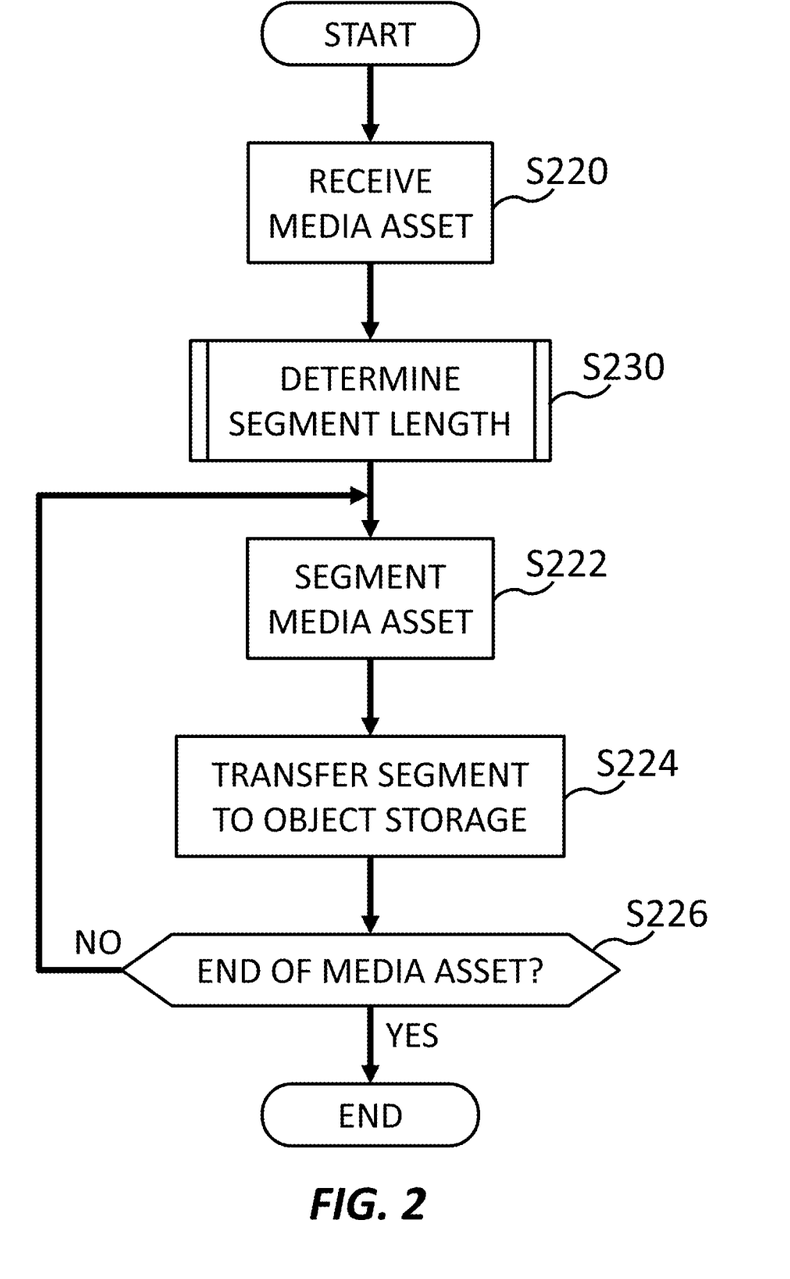
FIG. 2 is an operational flow for storage based media segmentation, according to at least one embodiment of the present invention.

FIG. 2 is an operational flow for storage based media segmentation, according to at least one embodiment of the present invention. The operational flow provides a method of storage based media segmentation. In at least some embodiments, the method is performed by an ingesting section of an apparatus, such as ingesting section 103 in FIG. 1, or correspondingly named sub-sections thereof.

At S220, the ingesting section or a sub-section thereof receives a media asset. In at least some embodiments, the ingesting section receives media asset 101 from a server across a network. In at least some embodiments, the ingesting section receives media asset 101 by reading media asset 101 from a computer-readable medium.

Figure 3:
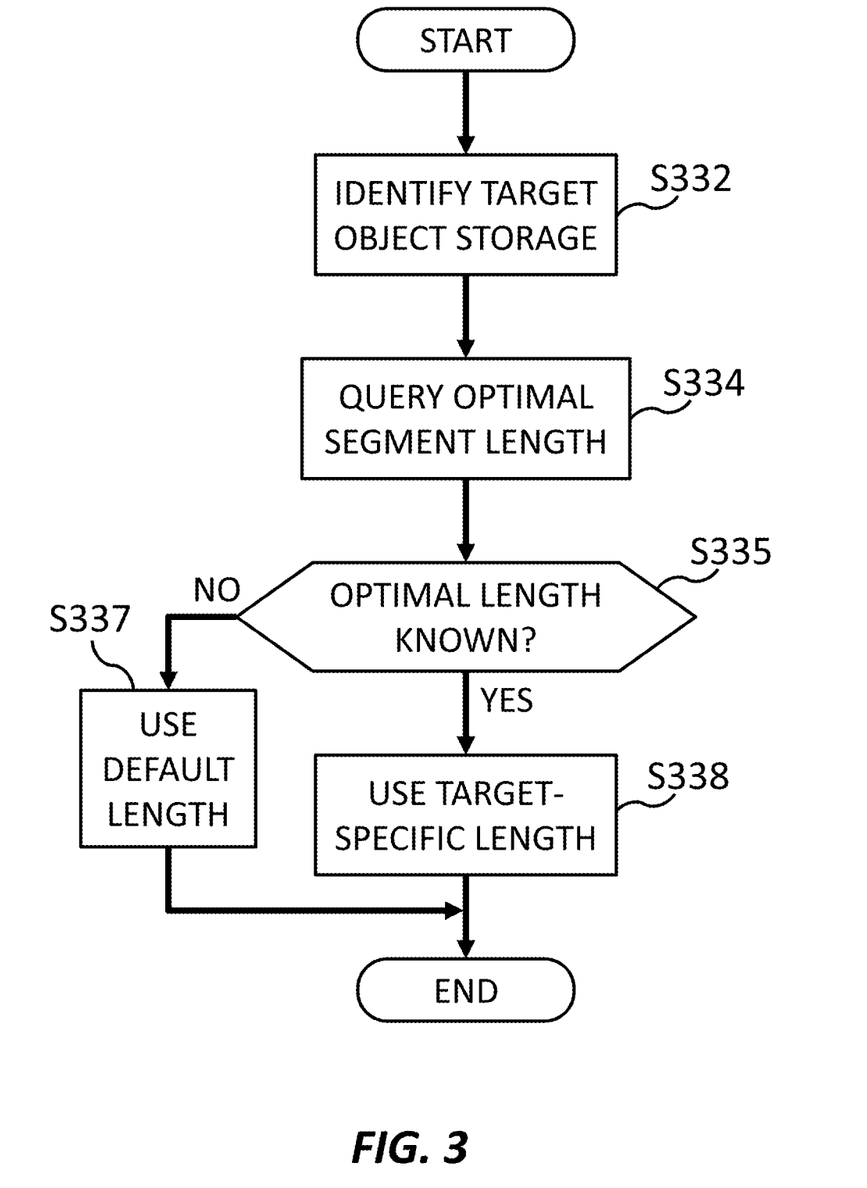
FIG. 3 is an operational flow for determining storage based media segmentation length, according to at least one embodiment of the present invention.

At S230, the ingesting section or a sub-section thereof determines a segment length for the media asset received at S220. In at least some embodiments, the ingesting section determines the first length based on a delivery speed of the object storage. In at least some embodiments, the segment length is a length of time corresponding to playback time of the media asset. In at least some embodiments, the ingesting section determines a segment length of about 10 seconds. In at least some embodiments, the segment length is a size of data storage occupied by a segment. In at least some embodiments, the ingesting section determines a segment length of about 10 megabytes. In at least some embodiments, the ingesting section determines a segment length based on the storage from which the apparatus will read the media asset for content delivery. In at least some embodiments, determining the first length includes testing the delivery speed of the object storage using a plurality of unique segment lengths. In at least some embodiments, determining the first length includes reading the first length from a table relating object storages to segment lengths. In at least some embodiments, segment length determination proceeds as shown in FIG. 3, which will be explained hereinafter.

At S222, the ingesting section or a sub-section thereof segments the media asset. In at least some embodiments, the ingesting section segments the media asset into a plurality of segments of the first length. In at least some embodiments, the ingesting section packages each segment among the plurality of segments of the first length into a first packet among the plurality of first packets. In at least some embodiments, the ingesting section separates a first portion of the media segment, or the remainder thereof, having the length determined at S230. As iterations of S222 proceed, in at least some embodiments, the ingesting section segments the media asset such that each segment has the length determined at S230 except for the last segment, which includes the remainder of the media asset once the remaining unsegmented portion of the media asset becomes shorter than the length determined at S230. In at least some embodiments, the ingesting section causes a transcoding section, such as transcoding section 104 in FIG. 1, to segment the media asset. In at least some embodiments, the ingesting section causes a packaging section, such as packaging section 105 in FIG. 1, to package each segment of the media asset.

At S224, the ingesting section or a sub-section thereof transfers the segment of the media asset segmented at S222 to an object storage, such as object storage 108 in FIG. 1. In at least some embodiments, the ingesting section stores the plurality of first packets in the object storage. In at least some embodiments, the ingesting section provides metadata and an identifier for the segment transferred to the object storage. As iterations of S224 proceed, in at least some embodiments, the ingesting section transfers segments to the object storage as the media asset is segmented.

At S226, the ingesting section or a sub-section thereof determines whether the end of the media asset has been reached. If the ingesting section determines that there is a remaining unsegmented portion of the media asset, then the operational flow returns to media asset segmentation at S222. If the ingesting section determines that there is not a remaining unsegmented portion of the media asset, then the operational flow ends.

FIG. 3 is an operational flow for determining storage based media segmentation length, according to at least one embodiment of the present invention. The operational flow provides a method of determining storage based media segmentation length. In at least some embodiments, the method is performed by an ingesting section of an apparatus, such as ingesting section 103 in FIG. 1, or correspondingly named sub-sections thereof.

At S332, the ingesting section or a sub-section thereof identifies an object storage, such as object storage 108 in FIG. 1, as the target for storing a segmented media asset. In at least some embodiments, the ingesting section identifies one object storage among a plurality of object storages for storing the segmented media asset, each object storage having unique properties. In at least some embodiments, a plurality of apparatuses, such as apparatus 100 in FIG. 1, share a single ingesting section, but are each in communication with a dedicated object storage.

At S334, the ingesting section or a sub-section thereof issues a query for the optimal segment length associated with the target object storage identified at S332. In at least some embodiments, the optimal segment length of the object storage is the segment length that results in the fastest read time when the segmented media asset is read from the object storage for delivery. In at least some embodiments, the speed of read time is measured based on reading of all segments for a fixed amount of playback time, such as five minutes. In at least some embodiments, the ingesting section refers to a locally stored Look Up Table (LUT) for a segment length associated with an identified of the target object storage. In at least some embodiments, the ingesting section issues the query to a server through a network. In at least some embodiments, the ingesting section performs a test by reading segments of different lengths from the object storage to determine which segment length is associated with the fastest read time.

At S335, ingesting section or a sub-section thereof determines whether the optimal length is known. In at least some embodiments, the ingesting section determines that the optimal length is not known in response to an optimal segment length not being found or received in response to a query issued at S334, or in response to the optimal segment length being otherwise indeterminable. If the ingesting section determines an optimal segment length, then the operational flow proceeds to S338, where the optimal segment length that is specific to the target object storage is used. If the ingesting section determines that an optimal segment length is not determinable, then the operational flow proceeds to S337, where a default segment length is used.

Figure 4:
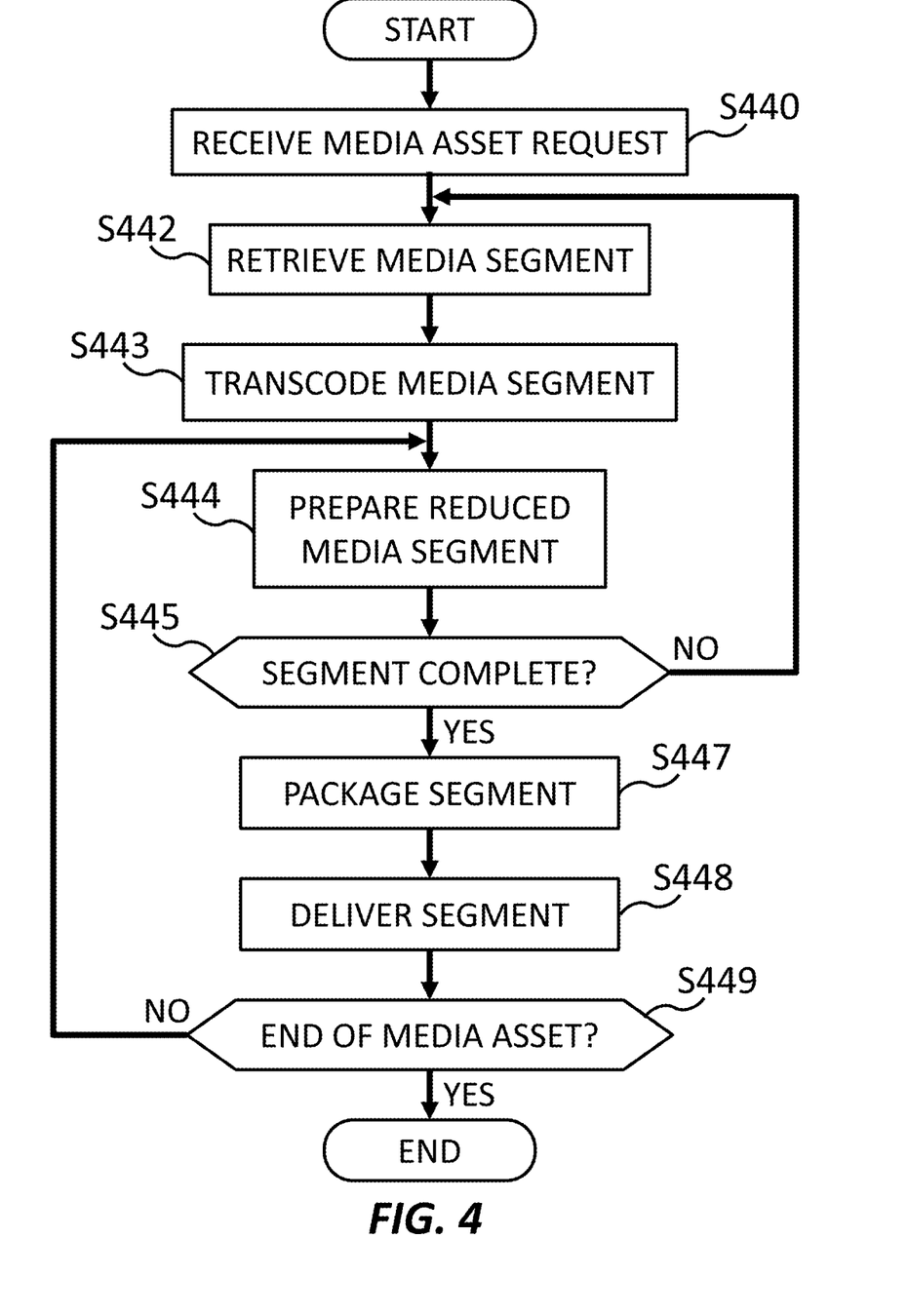
FIG. 4 is an operational flow for media re-segmentation for delivery, according to at least one embodiment of the present invention.

FIG. 4 is an operational flow for media re-segmentation for delivery, according to at least one embodiment of the present invention. The operational flow provides a method of re-segmenting a media asset for delivery. In at least some embodiments, the method is performed by a controller of an apparatus, such as controller 660 in FIG. 6, described hereinafter, or sections thereof.

At S440, an originating section, such as originating section 106 in FIG. 1, receives a request for a media asset. In at least some embodiments, the originating section receives a request from a network device for a media asset. In at least some embodiments, the originating section receives the request from an edge server of a content delivery network, such as content delivery network 110 in FIG. 1. In at least some embodiments, the originating section receives the request from a client device, such as client device 112 in FIG. 1. In at least some embodiments where the originating section receives the request from a client device, the apparatus is an edge server. In at least some embodiments, the request for the media asset includes an indication representing a compressed format. In at least some embodiments, the request for the media asset includes an indication representing a reduced quality level. In at least some embodiments, the request for the media asset includes an indication representing a package format. In at least some embodiments, the request for the media asset includes an indication representing the second length.

At S442, a controller or a section thereof retrieves a segment of the media asset requested at S440 from an object storage, such as object storage 108 of FIG. 1. As iterations of S442 proceed, in at least some embodiments, the controller retrieves segments of the media asset, sequentially in order of playback, until all of the segments making up the media asset have been retrieved. In at least some embodiments, the controller retrieves a plurality of first packets from an object storage, each first packet of the plurality of first packets including a segment of the media asset of a first length.

At S443, a transcoding section, such as transcoding section 104 in FIG. 1, or a sub-section thereof transcodes the media segment retrieved at S442. In at least some embodiments, the transcoding section decompresses or decodes the segment into a raw format, then compresses or encodes the segment into a format that is different from the format of the segment stored in the object storage. In at least some embodiments, the transcoding section reduces the quality of the media asset or changes the compression technique.

At S444, the controller or a section thereof prepares a segment of the media asset of reduced length. In at least some embodiments, the controller prepares, as the plurality of first packets are retrieved from the object storage, a plurality of second packets, each second packet of the plurality of second packets including a segment of the media asset of a second length, the second length being shorter than the first length. In at least some embodiments, the reduced length is more optimal or required for delivery. As iterations of S444 proceed, in at least some embodiments, the controller prepares two or more segments of reduced length from a single segment in object storage. In at least some embodiments, segments of the media asset in object storage are about 10 seconds long, and segments of the media asset are reduced to a length of about 3 seconds for delivery. In at least some embodiments, the transcoding section prepares the reduced length segments. In at least some embodiments, the transcoding section reduces the length of each media segment after decoding or decompression the segment into a raw format, but before encoding or compression the segment. In at least some embodiments, preparing the plurality of second packets includes transcoding each segment of the media asset of one of the first length or the second length into the compressed format. In at least some embodiments, preparing the plurality of second packets includes transcoding each segment of the media asset of one of the first length or the second length into the reduced quality level. In at least some embodiments, the preparing the plurality of second packets includes packaging each segment of the media asset of the second length according to the package format.

At S445, the controller or a section thereof determines whether a complete segment could be prepared at S444. In at least some embodiments, the controller cannot completely prepare a reduced segment at S444 because a portion of the reduced segment is in the next segment stored in the object storage. If the controller determines that the segment prepared at S444 is incomplete, then the operational flow returns to media segment retrieval at S442. If the controller determines that the segment prepared at S444 is complete, then the operational flow proceeds to media segment packaging at S447.

At S447, a packaging section, such as packaging section 105, packages the segment of the media asset reduced at S444. In at least some embodiments, the packaging section adds metadata and identification information to the segment. In at least some embodiments, the packaging section adds metadata according to the compression or encoding format, or according to a service or an application associated with the request for the media asset. In at least some embodiments, the packaging section is configured to combine a portion of each of two segments of the media asset of the first length to form one segment of the media asset of the second length.

At S448, the controller or a section thereof delivers the segment of the media asset. In at least some embodiments, the originating section delivers the segment of the media asset packaged at S447 to the edge server, client device, etc. from which the request for the media asset was received. In at least some embodiments, the originating section transmits, as the plurality of second packets are prepared, the plurality of second packets to the network device.

At S449, the controller or section thereof determines whether the end of the media asset has been reached. In at least some embodiments, the controller determines whether all segments of the media asset have been delivered. If the controller determines that there are more segments of the media asset to deliver, then the operational flow returns to reduced segment preparation at S444. If the controller determines that there are no more segments of the media asset to deliver, and that the end of the media asset has been reached, then the operational flow ends.

In the operational flow of FIG. 4, the controller delivers the media asset in different segment lengths than those stored on the object storage of the apparatus. In at least some embodiments, the media asset is, upon request, delivered in the same format and segment length as those stored in the object storage. In at least some embodiments, the controller receives a request from a content delivery server for the plurality of first packets, retrieves the plurality of first packets from the object storage, and transmits, as the plurality of first packets are retrieved from the object storage, the plurality of first packets to the content delivery server.

Figure 5:
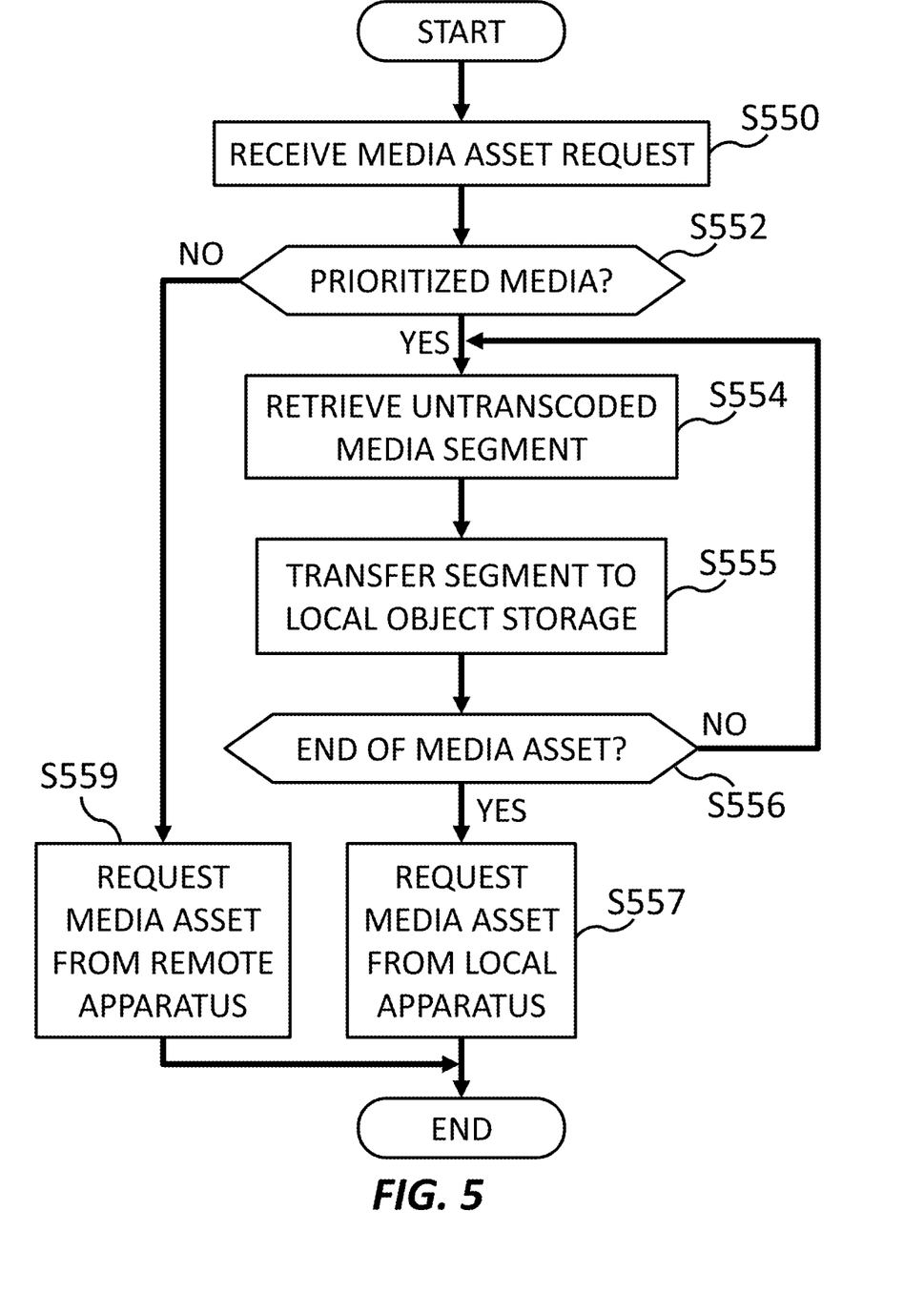
FIG. 5 is an operational flow for retrieving segments of a media asset, according to at least one embodiment of the present invention.

FIG. 5 is an operational flow for retrieving segments of a media asset, according to at least one embodiment of the present invention. The operational flow provides a method of retrieving segments of a media asset. In at least some embodiments, the method is performed by an edge server of a content delivery network, such as content delivery network 110 in FIG. 1.

At S550, the edge server receives a media asset request from a client device, such as client device 112 in FIG. 1. In at least some embodiments, the edge server intercepts a request for the media asset addressed to an originating server. In some embodiments, the request is an HTTP request, and the edge server may perform reverse HTTP proxy to intercept the request. In some embodiments, the digital content is identified in the request by a specific address on the originating server or other identifier.

At S552, the edge server determines whether the media asset identified in the request received at S552 is prioritized. In at least some embodiments, a media asset is prioritized in response to the edge server receiving many requests for the media asset within a period of time. In at least some embodiments, a media asset is prioritized in response to the edge server receiving 10 requests for the media asset within an hour. In at least some embodiments, the edge server receives a plurality of requests for the media asset within a temporal period, and determines that the number of requests in the plurality of requests within the temporal period exceeds a threshold rate. If the edge server determines that the media asset is prioritized, then the operational flow proceeds to untranscoded media segment retrieval at S554. If the edge server determines that the media asset is not prioritized, then the operational flow proceeds to remote media asset request at S559.

At S554, the edge server retrieves a segment of the media asset requested at S552 as segmented for object storage. In at least some embodiments, the edge server retrieves the plurality of first packets from an origin server. In at least some embodiments, the edge server retrieves the media segment from an originating section of a remote apparatus, such as originating section 106 in FIG. 1. In at least some embodiments, the originating section transmits the segment of the media asset directly from the object storage, without transcoding or packaging the segment. As iterations of S554 proceed, in at least some embodiments, a plurality of segments are sequentially retrieved in order of playback of the media asset.

At S555, the edge server transfers the segment of the media asset retrieved at S554 to a local object storage. In at least some embodiments, the edge server stores the plurality of first packets in the object storage. In at least some embodiments, the edge server includes the local object storage, which also includes a transcoding section, such as transcoding section 104 in FIG. 1, and a packaging section, such as packaging section 105 in FIG. 1. In at least some embodiments, the local object storage is in a local apparatus in direct communication with the edge server, or in a network location that is much closer to the edge server than the remote apparatus, from which the segment was retrieved at S554. As iterations of S554 proceed, in at least some embodiments, the plurality of segments are sequentially transferred in order of playback of the media asset.

At S556, the edge server determines whether the end of the media asset is reached. In at least some embodiments, the edge server determines whether all of the segments of the media asset have been retrieved and transferred to the local object storage. If the edge server determines that there are more segments of the media asset to retrieve and transfer, then the operational flow returns to segment retrieval at S444. If the controller determines that there are no more segments of the media asset to retrieve and transfer, and that the end of the media asset has been reached, then the operational flow proceeds to local media asset request at S557.

At S557, the edge server requests the media asset from the local apparatus. In at least some embodiments, the edge server includes the transcoding section and the packaging section, which together form the local apparatus. In at least some embodiments, the local apparatus is in direct communication with the edge server, or is in a network location that is much closer to the edge server than the remote apparatus. In at least some embodiments, the local apparatus performs the operational flow in FIG. 4 in response to receive the request for the media asset from the edge server.

At S559, the edge server requests the media asset from the remote apparatus. In at least some embodiments, the structure and functions of the remote apparatus are substantially similar to apparatus 100 in FIG. 1. In at least some embodiments, the local apparatus performs the operational flow in FIG. 4 in response to receive the request for the media asset from the edge server.

Figure 6:
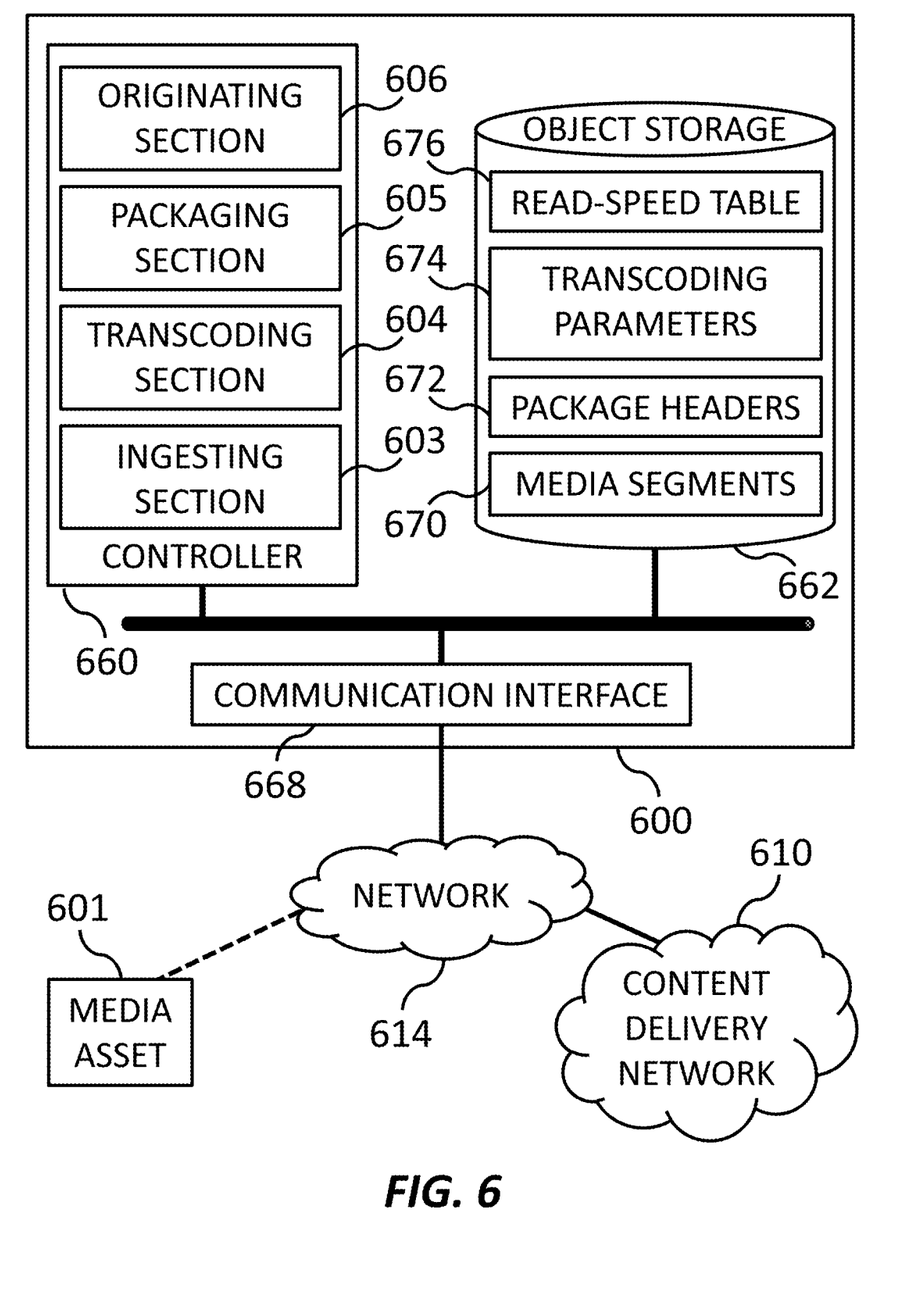
FIG. 6 is a block diagram of an exemplary hardware configuration for storage and delivery distinct media segmentation, according to at least one embodiment of the present invention.

FIG. 6 is a block diagram of an exemplary hardware configuration for storage and delivery distinct media segmentation, according to at least one embodiment of the present invention.

The exemplary hardware configuration includes apparatus 600, which communicates with network 614. Apparatus 600 may be a computer or other computing device that receives input or commands directly or indirectly through network 614. Apparatus 600 may be a host server that connects directly or indirectly to network 614. In some embodiments, apparatus 600 is a computer system that includes two or more computers. In some embodiments, apparatus 600 is a personal computer that executes an application for a user of apparatus 600.

Apparatus 600 includes a controller 660, an object storage 662, and a communication interface 668. In some embodiments, controller 660 includes a processor or programmable circuitry executing instructions to cause the processor or programmable circuitry to perform operations according to the instructions. In some embodiments, controller 660 includes analog or digital programmable circuitry, or any combination thereof. In some embodiments, controller 660 includes physically separated storage or circuitry that interacts through communication. In some embodiments, object storage 662 includes a non-volatile computer-readable medium capable of storing executable and non-executable data for access by controller 660 during execution of the instructions. Communication interface 668 transmits and receives data from network 614, and connects to various input and output units via a parallel port, a serial port, a keyboard port, a mouse port, a monitor port, and the like to accept commands and present information.

Controller 660 includes ingesting section 603, transcoding section 604, packaging section 605, and originating section 606. Object storage 662 includes media segments 670, package headers 672, transcoding parameters 674, and read-speed table 676.

Ingesting section 603 is the circuitry or instructions of controller 660 configured to receive and store media assets in object storage 662. In at least some embodiments, ingesting section 603 is configured to segment media assets into a plurality of media segments, such as media segments 670, each segment have a length based on the object storage. In at least some embodiments, ingesting section 603 is configured to determine the first length based on a delivery speed of the object storage, cause the transcoding section to segment the media asset into a plurality of segments of the first length, cause the packaging section package each segment among the plurality of segments of the first length into a first packet among the plurality of first packets, and store the plurality of first packets in the object storage. In at least some embodiments, ingesting section 603 utilizes information in object storage 662, such as transcoding parameters 674 and read-speed table 676. In at least some embodiments, ingesting section 603 includes sub-sections for performing additional functions, as described in the foregoing flow charts. In at least some embodiments, such sub-sections may be referred to by a name associated with their function.

Transcoding section 604 is the circuitry or instructions of controller 660 configured to transcode segments of media assets. In at least some embodiments, transcoding section 604 is configured to retrieve segments of media assets, such as media segments 670, from object storage 662, and prepare segments of a different length for delivery. In at least some embodiments, transcoding section 604 is configured to transcode, as the plurality of first packets are retrieved from the object storage, each segment of the media asset of the first length into a segment of the media asset of a second length, the second length being shorter than the first length. In at least some embodiments, transcoding section 604 utilizes information in object storage 662, such as media segments 670 and transcoding parameters 674. In at least some embodiments, transcoding section 874 includes sub-sections for performing additional functions, as described in the foregoing flow charts. In at least some embodiments, such sub-sections may be referred to by a name associated with their function.

Packaging section 605 is the circuitry or instructions of controller 660 configured to package segments of media assets for delivery. In at least some embodiments, packaging section 605 is configured to add metadata and identification information to media segments according to the service or application associated with the request for the media asset. In at least some embodiments, packaging section 605 is configured to package, as the media asset is transcoded into segments of the second length, each segment of the media asset of the second length into a second packet among a plurality of second packets. In at least some embodiments, packaging section 605 utilizes information in object storage 662, such as media segments 670 and package headers 672. In at least some embodiments, packaging section 605 includes sub-sections for performing additional functions, as described in the foregoing flow charts. In at least some embodiments, such sub-sections may be referred to by a name associated with their function.

Originating section 606 is the circuitry or instructions of controller 660 configured to receive requests for media assets and to deliver media segments. In at least some embodiments, originating section 606 is configured to receive requests for media assets from edge servers in content delivery network 610, and to deliver media segments after transcoding by transcoding section 604 and packaging by packaging section 605. In at least some embodiments, originating section 606 is configured to receive a request from a network device for a media asset and to retrieve a plurality of first packets from an object storage, each first packet of the plurality of first packets including a segment of the media asset of a first length. In at least some embodiments, originating section 606 is further configured to transmit, as the plurality of second packets are packaged, the plurality of second packets to the network device. In at least some embodiments, originating section 606 utilizes information in object storage 662, such as media segments 670. In at least some embodiments, originating section 606 includes sub-sections for performing additional functions, as described in the foregoing flow charts. In at least some embodiments, such sub-sections are referred to by a name associated with the corresponding function.

In at least some embodiments, the apparatus is another device capable of processing logical functions in order to perform the operations herein. In at least some embodiments, the controller and the object storage need not be entirely separate devices, but share circuitry or one or more computer-readable mediums in some embodiments. In at least some embodiments, the object storage includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

Various embodiments of the present invention are described with reference to flowcharts and block diagrams whose blocks may represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Various embodiments of the present invention include a system, a method, and/or a computer program product. In some embodiments, the computer program product includes a computer readable storage medium (or media) having computer readable program instructions thereon for causing a processor to carry out aspects of the present invention.

In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may includes copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. It will be apparent to persons skilled in the art that various alterations and improvements can be added to the above-described embodiments. It will also be apparent from the scope of the claims that the embodiments added with such alterations or improvements are included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

According to at least one embodiment of the present invention, storage and delivery distinct media segmentation is performed by receiving a request from a network device for a media asset, retrieving a plurality of first packets from an object storage, each first packet of the plurality of first packets including a segment of the media asset of a first length, preparing, as the plurality of first packets are retrieved from the object storage, a plurality of second packets, each second packet of the plurality of second packets including a segment of the media asset of a second length, the second length being shorter than the first length, and transmitting, as the plurality of second packets are prepared, the plurality of second packets to the network device.

Some embodiments include instructions in a computer program recorded onto a computer-readable medium for performing the operations of the controller when executed by the computer, and a method of operations performed by the controller.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions executable by a processor to cause the processor to perform operations comprising:
   determining a first length of a segment of a media asset included in each first packet of a plurality of first packets based on a delivery speed of an object storage;
   segmenting the media asset into a plurality of segments of the first length;
   packaging each segment among the plurality of segments of the first length into a corresponding first packet among the plurality of first packets;
   storing the plurality of first packets in the object storage;

receiving a request from a network device for the media asset, the request for the media asset including an indication representing a package format;

retrieving the plurality of first packets from the object storage;

preparing, as the plurality of first packets are retrieved from the object storage, a plurality of second packets, each second packet of the plurality of second packets including a segment of the media asset of a second length, the second length being shorter than the first length, the preparing including packaging each segment of the media asset of the second length according to the package format, the packaging including combining a portion of each of two segments of the media asset of the first length to form one segment of the media asset of the second length; and transmitting, as the plurality of second packets are prepared, the plurality of second packets to the network device.

2. The computer-readable medium according to claim 1, wherein the request for the media asset includes an indication representing a compressed format; and wherein the preparing the plurality of second packets includes transcoding each segment of the media asset of one of the first length or the second length into the compressed format.

3. The computer-readable medium according to claim 1, wherein the request for the media asset includes an indication representing a reduced quality level; and wherein the preparing the plurality of second packets includes transcoding each segment of the media asset of one of the first length or the second length into the reduced quality level.

4. The computer-readable medium according to claim 1, wherein the request for the media asset includes an indication representing the second length.

5. The computer-readable medium according to claim 1, wherein the determining the first length includes testing the delivery speed of the object storage using a plurality of unique segment lengths.

6. The computer-readable medium according to claim 1, wherein the determining the first length includes reading the first length from a table relating object storages to segment lengths.

7. The computer-readable medium according to claim 1, further comprising receiving a request from a content delivery server for the plurality of first packets;

retrieving the plurality of first packets from the object storage; and transmitting, as the plurality of first packets are retrieved from the object storage, the plurality of first packets to the content delivery server.

8. The computer-readable medium according to claim 1, further comprising:

receiving a plurality of requests for the media asset within a temporal period;

determining whether a number of requests in the plurality of requests within the temporal period exceeds a threshold rate;

retrieving the plurality of first packets from an origin server in response to determining that the number of requests within the temporal period exceeds the threshold rate; and storing the plurality of first packets in the object storage.

9. A method comprising:

determining a first length of a segment of a media asset included in each first packet of a plurality of first packets based on a delivery speed of an object storage;

segmenting the media asset into a plurality of segments of the first length;

packaging each segment among the plurality of segments of the first length into a corresponding first packet among the plurality of first packets;

storing the plurality of first packets in the object storage;

receiving a request from a network device for the media asset, the request for the media asset including an indication representing a package format;

retrieving the plurality of first packets from the object storage;

preparing, as the plurality of first packets are retrieved from the object storage, a plurality of second packets, each second packet of the plurality of second packets including a segment of the media asset of a second length, the second length being shorter than the first length, the preparing including packaging each segment of the media asset of the second length according to the package format, the packaging including combining a portion of each of two segments of the media asset of the first length to form one segment of the media asset of the second length; and transmitting, as the plurality of second packets are prepared, the plurality of second packets to the network device.

10. The method according to claim 9, wherein the request for the media asset includes an indication representing a compressed format; and wherein the preparing the plurality of second packets includes transcoding each segment of the media asset of one of the first length or the second length into the compressed format.

11. The method according to claim 9, wherein the request for the media asset includes an indication representing a reduced quality level; and wherein the preparing the plurality of second packets includes transcoding each segment of the media asset of one of the first length or the second length into the reduced quality level.

12. The method according to claim 9, wherein the request for the media asset includes an indication representing the second length.

13. An apparatus comprising:

a controller including circuitry configured to perform operations including:

determining a first length of a segment of a media asset included in each first packet of a plurality of first packets based on a delivery speed of an object storage, segmenting the media asset into a plurality of segments of the first length, packaging each segment among the plurality of segments of the first length into a corresponding first packet among the plurality of first packets, and storing the plurality of first packets in the object storage;

receiving a request from a network device for the media asset, the request for the media asset including an indication representing a package format;

retrieving the plurality of first packets from the object storage;

transcoding, as the plurality of first packets are retrieved from the object storage, each segment of the media asset of the first length into a segment of the media asset of a second length, the second length being shorter than the first length;

packaging, as the media asset is transcoded into segments of the second length, each segment of the media asset of the second length into a second packet among a plurality of second packets according to the package format, the packaging including combining a portion of each of two segments of the media asset of the first length to form one segment of the media asset of the second length; and transmitting, as the plurality of second packets are packaged, the plurality of second packets to the network device.

* * * * *